DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED MARCH 21, 1972

896 O.G. 832

T896,039

PLASTISOLS OF POLYVINYL CHLORIDE AND ITS COPOLYMERS

David L. Valentine, 4508 Chickasaw Road 37664; Don R. Leonard, 1425 Warpath Drive 37664; and Albert D. Beeler, 3320 Grandview 37660, all of Kingsport, Tenn.

Continuation-in-part of application Ser. No. 868,679, Oct. 23, 1969. This application Dec. 28, 1970, Ser. No. 102,243

Int. Cl. C08f *19/14;* C08h *9/00*

U.S. Cl. 260—23

No Drawing. 22 Pages Specification

A plasticizer blend for plastisols of polyvinyl chloride, or copolymers of polyvinyl chloride, particularly useful in carpet backings. The blend comprises 2,2,4-trimethylpentane-1,3-diol diisobutyrate, a dialkyl phthalate in which each of the alkyl moieties contain from 6 to 10 carbon atoms, and either (a) 2,2,4-trimethylpentane-1,3-diol monoisobutyrate monobenzoate or (b) a dialkyl phthalate in which each of the alkyl moieties contain from 4 to 6 carbon atoms.